(12) United States Patent
Kim et al.

(10) Patent No.: US 9,129,750 B2
(45) Date of Patent: Sep. 8, 2015

(54) MULTILAYERED CERAMIC ELECTRONIC COMPONENT AND MANUFACTURING METHOD THEREOF

(71) Applicant: SAMSUNG ELECTRO-MECHANICS CO., LTD., Suwon, Gyunggi-do (KR)

(72) Inventors: Wi Heon Kim, Gyunggi-Do (KR); Doo Young Kim, Gyunggi-Do (KR); Jae Yeol Choi, Gyunggi-Do (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 224 days.

(21) Appl. No.: 13/747,045

(22) Filed: Jan. 22, 2013

(65) Prior Publication Data

US 2014/0126104 A1    May 8, 2014

(30) Foreign Application Priority Data

Nov. 6, 2012    (KR) .......................... 10-2012-0125024

(51) Int. Cl.
  *H01G 4/06* (2006.01)
  *H01G 4/30* (2006.01)
  *H01G 4/12* (2006.01)

(52) U.S. Cl.
  CPC .................................. *H01G 4/1209* (2013.01)

(58) Field of Classification Search
  CPC .............. H01G 4/30; H01G 4/06; H01G 4/12
  USPC ....................................... 361/301.4, 311, 303
  See application file for complete search history.

(56) References Cited

U.S. PATENT DOCUMENTS

| 2003/0205803 A1 | 11/2003 | Kawamoto | |
| 2004/0107555 A1* | 6/2004 | Hattori et al. | 29/25.42 |
| 2005/0088803 A1 | 4/2005 | Umeda et al. | |
| 2005/0128683 A1* | 6/2005 | Watanabe et al. | 361/321.4 |
| 2005/0219795 A1* | 10/2005 | Murosawa et al. | 361/321.2 |

(Continued)

FOREIGN PATENT DOCUMENTS

| JP | 2001-006902 A | 1/2001 |
| JP | 2005-129802 A | 5/2005 |

(Continued)

OTHER PUBLICATIONS

Notice of Office Action Japanese Patent Application No. 2013-002556 dated Oct. 22, 2013 with English translation.

*Primary Examiner* — Eric Thomas
(74) *Attorney, Agent, or Firm* — McDermott Will & Emery LLP

(57) ABSTRACT

There is provided a multilayered ceramic electronic component including: a ceramic body including dielectric layers having an average thickness of 0.6 μm or less; and first and second internal electrodes, wherein the ceramic body includes a capacitance formation part and a non-capacitance formation part provided on at least one surface of upper and lower surfaces of the capacitance formation part, and when the capacitance formation part is divided into three regions in a thickness direction of the ceramic body, in a central region among the three regions, dielectric grains have an average particle size of 150 nm or less, and the number of dielectric grains per layer is 4 or more, and in upper and lower regions, dielectric grains have an average particle size of 200 nm or less, respectively, and the number of dielectric grains per layer is 3 or more.

13 Claims, 2 Drawing Sheets

(56) References Cited

U.S. PATENT DOCUMENTS

| | | | |
|---|---|---|---|
| 2006/0087796 A1* | 4/2006 | Yamazaki et al. | 361/321.2 |
| 2006/0213604 A1* | 9/2006 | Fukui et al. | 156/89.14 |
| 2008/0225500 A1* | 9/2008 | Kuroda et al. | 361/767 |
| 2011/0141652 A1* | 6/2011 | Chang et al. | 361/272 |
| 2012/0147518 A1 | 6/2012 | Matsuda et al. | |

FOREIGN PATENT DOCUMENTS

| | | |
|---|---|---|
| JP | 2011-195444 A | 10/2011 |
| WO | 2011024582 A1 | 3/2011 |

\* cited by examiner

MULTILAYERED CERAMIC ELECTRONIC COMPONENT AND MANUFACTURING METHOD THEREOF

CROSS-REFERENCE TO RELATED APPLICATIONS

This application claims the priority of Korean Patent Application No. 10-2012-0125024 filed on Nov. 6, 2012, in the Korean Intellectual Property Office, the disclosure of which is incorporated herein by reference.

BACKGROUND OF THE INVENTION

1. Field of the Invention

The present invention relates to a high capacitance multilayered ceramic electronic component having excellent withstand voltage characteristics and excellent reliability, able to reduce acoustic noise, and a manufacturing method thereof.

2. Description of the Related Art

In accordance with the recent trend for the miniaturization of electronic products, a multilayered ceramic electronic component having high capacitance and a small size has been demanded.

Therefore, dielectric and internal electrode layers have been thinned and stacked in increasing numbers through various methods. Recently, as a thickness of dielectric layers has been reduced, multilayered ceramic electronic components having an increased number of stacked layers have been fabricated.

In order to implement a multilayered ceramic electronic component having the high capacitance, as thicknesses of dielectric and internal electrode layers are reduced, the thickness of internal electrode layers may become non-uniform, and may not be continuously maintained, such that the electrode layer may be partially disconnected. As a result, connectivity of the internal electrode layer may be deteriorated.

In addition, as the electrodes are disconnected, even when average thicknesses of the dielectric layers are the same as each other, the dielectric layers may be increased or reduced in thickness in portions thereof. A thinned portion of the dielectric layer may have deteriorated insulating characteristics and reliability.

Further, as electronic components have been miniaturized, thinned, and multilayered, a phenomenon in which noise such as acoustic noise is generated in the electronic component has gradually increased.

Since a ferroelectric material using barium titanate as a ceramic material has a piezoelectric phenomenon, when a thickness of the ceramic electronic component is thinned in the case of applying an electrical field thereto, the acoustic noise phenomenon may significantly deteriorate.

In particular, as the thickness of the ceramic electronic component is thinned, an amount of lead is increased to be greater than that of a general chip at the time of mounting the ceramic electronic component on a substrate, such that a vibration phenomenon of the substrate may be significantly increased.

Therefore, in order to reduce the acoustic noise phenomenon generated in multilayered ceramic electronic components having high capacitance and high reliability, the number of particles per a unit thickness of the dielectric layer should be increased by using particulate materials.

However, a multilayered ceramic electronic component having high capacitance and high reliability, able to reduce acoustic noise, has been still required.

Related Art Document

Japanese Patent Laid-Open Publication No. JP 2005-129802

SUMMARY OF THE INVENTION

An aspect of the present invention provides a high capacitance multilayered ceramic electronic component having excellent withstand voltage characteristics and excellent reliability, and reducing acoustic noise, and a manufacturing method thereof.

According to an aspect of the present invention, there is provided a multilayered ceramic electronic component including: a ceramic body including dielectric layers having an average thickness of 0.6 μm or less; and first and second internal electrodes disposed in the ceramic body so as to face each other, having the dielectric layer interposed therebetween, wherein the ceramic body includes a capacitance formation part in which capacitance is formed and a non-capacitance formation part provided on at least one surface of upper and lower surfaces of the capacitance formation part, and when the capacitance formation part is divided into three regions in a thickness direction of the ceramic body, in a central region among the three regions, dielectric grains have an average particle size of 150 nm or less, and the number of dielectric grains per layer is 4 or more, and in upper and lower regions, dielectric grains have an average particle size of 200 nm or less, respectively, and the number of dielectric grains per layer is 3 or more.

When a length and a width of the ceramic body are 0.6±0.1 mm and 0.3±0.1 mm, respectively, a thickness of the ceramic body may be 0.22 mm or less.

When a length and a width of the ceramic body are 1.0±0.1 mm and 0.5±0.1 mm, respectively, a thickness of the ceramic body may be 0.35 mm or less.

When a length and a width of the ceramic body are 1.6±0.1 mm and 0.8±0.1 mm, respectively, a thickness of the ceramic body may be 0.55 mm or less.

The first and second internal electrodes may have an average thickness of 0.6 μm or less, respectively.

The first internal electrode or the second internal electrode may have connectivity of 95% or more.

According to another aspect of the present invention, there is provided a multilayered ceramic electronic component including: a ceramic body including dielectric layers; and first and second internal electrodes disposed in the ceramic body so as to face each other, having the dielectric layer interposed therebetween, wherein the ceramic body includes a capacitance formation part in which capacitance is formed and a non-capacitance formation part provided on at least one surface of upper and lower surfaces of the capacitance formation part, and when the capacitance formation part is divided into three regions in a thickness direction of the ceramic body, in a central region among the three regions, dielectric grains have an average particle size of 150 nm or less, and the number of dielectric grains per layer is 4 or more, and in upper and lower regions, dielectric grains have an average particle size of 200 nm or less, respectively, the number of dielectric grains per layer is 3 or more, and each thickness of the upper and lower regions satisfies 1 to 20% based on the entire thickness of the capacitance formation part in a thickness direction of the ceramic body.

When a length and a width of the ceramic body are 0.6±0.1 mm and 0.3±0.1 mm, respectively, a thickness of the ceramic body may be 0.22 mm or less.

When a length and a width of the ceramic body are 1.0±0.1 mm and 0.5±0.1 mm, respectively, a thickness of the ceramic body may be 0.35 mm or less.

When a length and a width of the ceramic body are 1.6±0.1 mm and 0.8±0.1 mm, respectively, a thickness of the ceramic body may be 0.55 mm or less.

The first and second internal electrodes may have an average thickness of 0.6 μm or less, respectively.

The dielectric layer may have an average thickness of 0.6 μm or less.

The first internal electrode or the second internal electrode may have connectivity of 95% or more.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
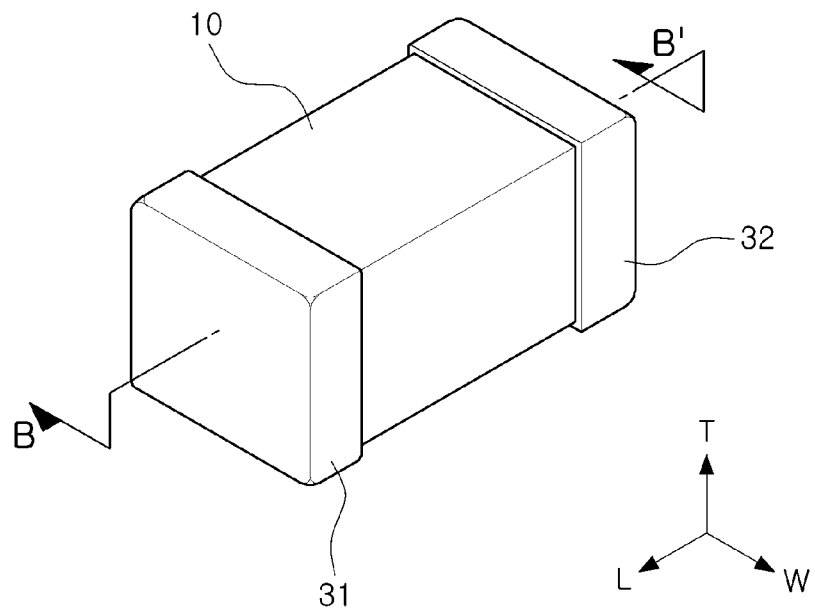
FIG. 1 is a perspective view schematically showing a multilayered ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements maybe exaggerated for clarity, and the same reference numerals will be used throughout to designate the same or like elements.

FIG. 1 is a perspective view schematically showing a multilayered ceramic capacitor according to an embodiment of the present invention.

Figure 2:
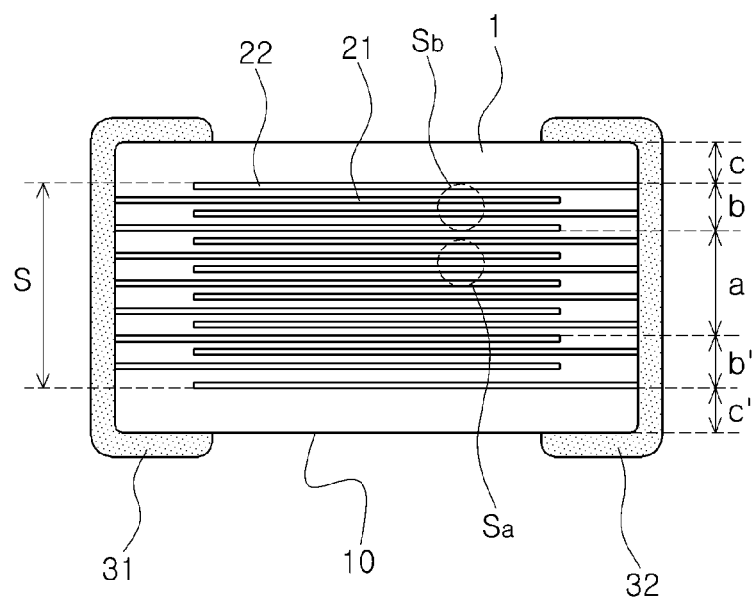
FIG. 2 is a cross-sectional view taken along line B-B' of FIG. 1.

FIG. 2 is a cross-sectional view taken along the line B-B' of FIG. 1.

Figure 3:
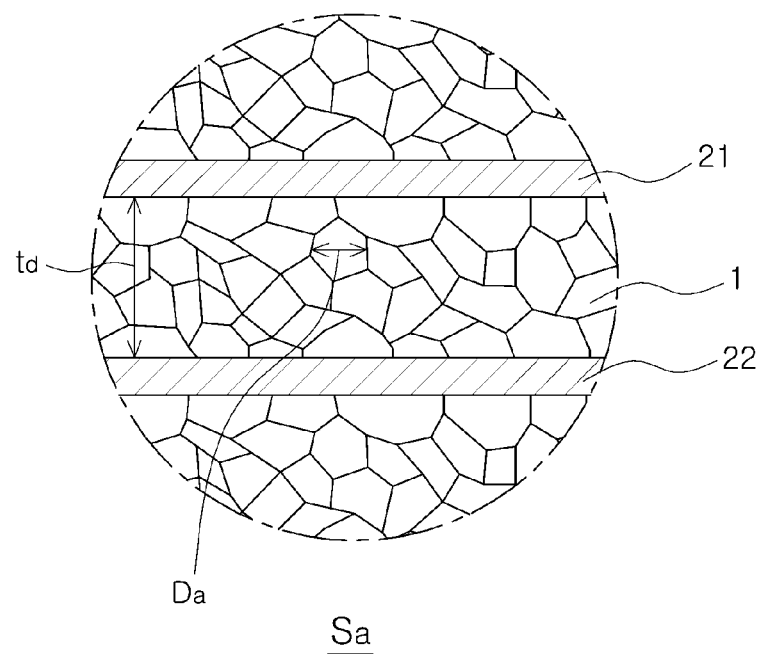
FIG. 3 is an enlarged view of a region $S_a$ of FIG. 2.

FIG. 3 is an enlarged view of a region $S_a$ of FIG. 2.

Figure 4:
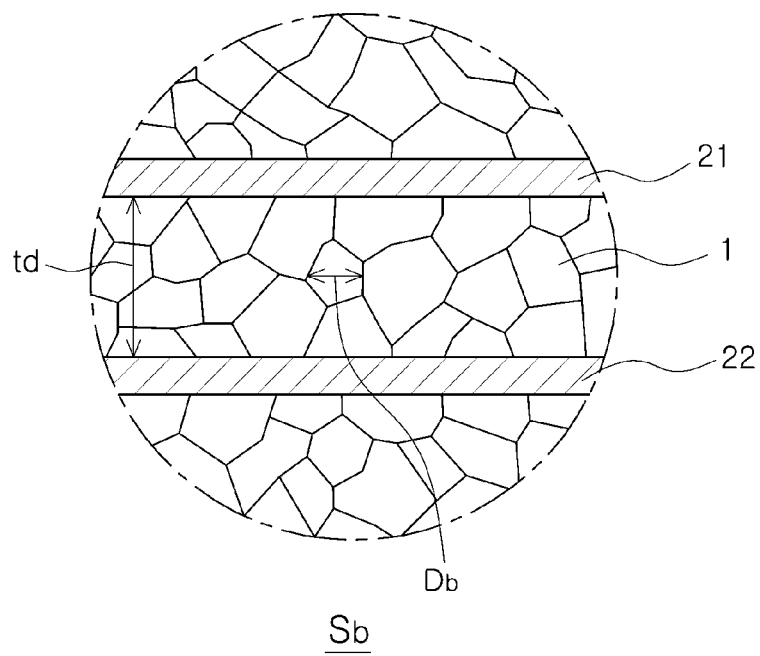
FIG. 4 is an enlarged view of a region $S_b$ of FIG. 2.

FIG. 4 is an enlarged view of a region $S_b$ of FIG. 2.

Referring to FIGS. 1 to 4, a multilayered ceramic electronic component according to an embodiment of the present invention may include: a ceramic body 10 including dielectric layers 1 having an average thickness of 0.6 μm or less; and first and second internal electrodes 21 and 22 disposed in the ceramic body 10 so as to face each other, having the dielectric layer therebetween, wherein the ceramic body 10 includes a capacitance formation part S in which capacitance is formed and non-capacitance formation part c, c' provided on at least one surface of upper and lower surfaces of the capacitance formation part S, and in the case that the capacitance formation part S is divided into three regions in a thickness direction of the ceramic body, dielectric grains of a central region a among the three regions may have an average particle size Da of 150 nm or less, the number of dielectric grains per layer maybe 4 or more, in upper and lower regions b and b', dielectric grains may have an average particle size Db of 200 nm or less, respectively, and the number of dielectric grains per layer may be 3 or more.

Hereinafter, the multilayered ceramic electronic component according to the embodiment of the present invention will be described. In particular, a multilayered ceramic capacitor will be described. However, the present invention is not limited thereto.

The ceramic body 10 is not particularly limited. For example, the ceramic body 10 may have a hexahedron shape.

Meanwhile, in the multilayered ceramic capacitor according to the embodiment of the present invention, a 'length direction' refers to an 'L' direction, a 'width direction' refers to a 'W' direction, and a 'thickness direction' refers to a 'T' direction of FIG. 1. Here, the 'thickness direction' is the same as a direction in which dielectric layers are stacked, that is, a 'stacking direction'.

The multilayered ceramic capacitor according to the embodiment of the present invention may include the ceramic body 10 including dielectric layers 1 having an average thickness of 0.6 μm or less; and first and second internal electrodes 21 and 22 formed in the ceramic body 10.

The first and second internal electrodes 21 and 22 are not particularly limited. For example, the first and second internal electrodes 21 and 22 may be formed using a conductive paste formed of at least one material of a noble metal material such as palladium (Pd), a palladium-silver (Pd—Ag) alloy, or the like, nickel (Ni) and copper (Cu).

In order to form the capacitance, first and second external electrodes 31 and 32 may be formed on an outer side of the ceramic body 10, and electrically connected to the first and second internal electrodes 21 and 22.

The first and second external electrodes 31 and 32 may be formed of the same conductive materials as that of the internal electrode, but are not limited thereto. For example, the first and second external electrodes 31 and 32 maybe formed of copper (Cu), silver (Ag), nickel (Ni), or the like.

The first and second external electrodes 31 and 32 may be formed by applying and firing a conductive paste prepared by adding glass frit to the metal powder.

According to the embodiment of the present invention, the dielectric layers 1 may have an average thickness of 0.6 μm or less.

In the embodiment of the present invention, the thickness of the dielectric layer 1 may refer to the average thickness of the dielectric layer 1 disposed between the internal electrodes 21 and 22.

The average thickness of the dielectric layers 1 may be measured by scanning a cross-section of the ceramic body 10 in a length direction as an image, by using scanning electron microscope (SEM), as shown in FIG. 2.

More specifically, the average thickness may be calculated by measuring each thickness at thirty equidistant points in a length direction with respect to an optional dielectric layer extracted from the image obtained by scanning a cross section in the length and thickness directions L-T taken at a central portion of the ceramic body 10 in the width (W) direction using the SEM as shown in FIG. 2.

The thirty equidistant points may be measured in the capacitance formation part which indicates the area in which the first and second internal electrodes 21 and 22 are overlapped with each other.

In addition, in the case in which the average value measurement is applied to 10 and more dielectric layers and the average value thereof is obtained, the average thickness of the dielectric layers may be relatively more generalized.

According to the embodiment of the present invention, the ceramic body 10 may include a capacitance formation part S in which capacitance is formed and non-capacitance formation part c, c' provided on at least one surface of upper and lower surfaces of the capacitance formation part S.

In the case that the capacitance formation part S is divided into three regions in a thickness direction of the ceramic body 10, dielectric grains of a central region a among the three regions have an average particle size Da of 150 nm or less, the number of dielectric grains per layer is 4 or more, and in upper and lower regions b and b', dielectric grains have an average particle size Db of 200 nm or less, respectively, and the number of dielectric grains per layer is 3 or more, whereby connectivity of the internal electrode may be improved to implement the multilayered ceramic electronic component having excellent withstand voltage characteristics and excellent reliability.

That is, in the case in which the average thickness of the dielectric layer 1 is 0.6 μm or less, the connectivity of the first and second internal electrodes 21 and 22 may be deteriorated. However, according to the embodiment of the present invention, the capacitance formation part S is divided into three regions in a thickness direction of the ceramic body 10, and the average particle size of the dielectric grains of each region and the number of dielectric grains per layer are controlled, whereby the connectivity of the internal electrode may be increased.

In addition, as described above, the average particle size of the dielectric grains of the central region a and the upper and lower regions b and b' in the capacitance formation part S and the number of dielectric grains per layer are controlled, such that the entire thickness of the multilayered ceramic electronic component may be decreased, whereby the electronic component having excellent reliability may be implemented and acoustic noise may be reduced.

Meanwhile, in the case in which the average thickness of the dielectric layer 1 is more than 0.6 μm, since the average thickness of the dielectric layer is relatively thick, there may be no deterioration in insulation characteristics and reliability as described above.

In general, at the time of manufacturing the multilayered ceramic capacitor, a difference in a firing extent and a firing rate for respective regions of the ceramic body during a firing process of the ceramic body may occur.

Due to the difference generated during the firing process, the connectivity of the internal electrode of the ceramic body after the firing process may be different in a thickness direction of the ceramic body. In particular, in the case of a high capacitance multilayered ceramic capacitor, the difference in the connectivity may be significant due to thin internal electrode and thin dielectric layer.

Therefore, according to the embodiment of the present invention, the average particle size of the dielectric grains for each region and the number of dielectric grains per layer in the capacitance formation part of the ceramic body may be differently controlled in order to improve the insulation characteristics and the reliability of the high capacitance multilayered ceramic capacitor and reduce the acoustic noise.

That is, the dielectric grains of the central region a of the capacitance formation part S may have the average particle size of 150 nm or less, and the number of dielectric grains per layer may be 4 or more, and in upper and lower regions b and b', dielectric grains may have an average particle size Db of 200 nm or less, respectively, and the number of dielectric grains per layer may be 3 or more.

In the case in which the average particle size Da of the dielectric grains of the central region a of the capacitance formation part S is more than 150 nm, or the number of dielectric grains per layer is less than 4; a short-circuit defect occurrence rate between the internal electrodes may be increased, the reliability may be deteriorated, and the acoustic noise may be increased.

In the case in which the average particle size Db of the dielectric grains of the upper and lower regions b and b' of the capacitance formation part S is more than 200 nm, or the number of dielectric grains per layer is less than 3, the connectivity of the internal electrode may be decreased, and accordingly the reliability may be deteriorated.

Meanwhile, according to the embodiment of the present invention, when a length and a width of the ceramic body 10 are 0.6±0.1 mm and 0.3±0.1 mm, respectively, the thickness of the ceramic body 10 may be 0.22 mm or less.

In addition, when the length and the width of the ceramic body 10 are 1.0±0.1 mm and 0.5±0.1 mm, respectively, the thickness of the ceramic body 10 may be 0.35 mm or less.

In addition, when the length and the width of the ceramic body 10 are 1.6±0.1 mm and 0.8±0.1 mm, respectively, the thickness of the ceramic body 10 may be 0.55 mm or less.

That is, in the case in which the ceramic body is generally manufactured to have a thickness in a predetermined range or less for each size standard thereof, there may be deterioration in the insulation characteristics and the reliability, and in particular, the acoustic noise may be increased.

However, according to the embodiment of the present invention, even in the case that the ceramic body 10 is manufactured to have a thickness in a predetermined range or less for the size standard thereof, the average particle size of the dielectric grains of the central region a and the upper and lower regions b and b' and the number of dielectric grains per layer in the capacitance formation part S maybe controlled, whereby the insulation characteristics and the reliability may be excellent, and the acoustic noise may be reduced.

In the case in which the thickness of the ceramic body 10 is more than 0.22 mm when the length and the width of the ceramic body 10 are 0.6±0.1 mm and 0.3±0.1 mm, respectively, the thickness thereof is sufficiently thick, such that there may be no deterioration in the insulation characteristics and the reliability and may be no problem with respect to the acoustic noise.

Similarly, in the case in which the thickness of the ceramic body 10 is more than 0.35 mm and 0.55 mm respectively when the length and the width of the ceramic body 10 are 1.0±0.1 mm and 0.5±0.1 mm, respectively, and 1.6±0.1 mm and 0.8±0.1 mm, respectively, there may be no deterioration in the insulation characteristics and the reliability and may be no problem with respect to the acoustic noise.

The thickness of the upper regions b and c and the lower regions b' and c' is not particularly limited. For example, each thickness of the upper regions b and c and the lower regions b' and c' may be 1 to 20% based on the entire thickness of the capacitance formation part in a thickness direction of the ceramic body.

Each thickness of the upper regions and the lower regions satisfies 1 to 20% based on the entire thickness of the capacitance formation part, such that the connectivity of the internal electrode is increased, whereby the multilayered ceramic electronic component having excellent withstand voltage characteristics and reliability may be implemented.

In the case in which each thickness of the upper and the lower regions is less than 1% based on the entire thickness of the capacitance formation part, since the average particle size of the dielectric grains and the number of dielectric grains per layer in the capacitance formation part are constant, the connectivity of the internal electrode may not be increased, such that the withstand voltage characteristics and the reliability may not be improved.

In the case in which each thickness of the upper and the lower regions is more than 20% based on the entire thickness of the capacitance formation part, since a region that the average particle size of the dielectric grains is relatively large becomes increased, the insulation characteristics and reliability may be deteriorated.

The average thickness of the first and second internal electrodes 21 and 22 after the firing process is not particularly limited as long as the internal electrode may have capacitance. For example, the average thickness of the first and second internal electrodes may be 0.6 μm or less.

Referring to FIG. 2, according to the multilayered ceramic electronic component according to the embodiment of the present invention, the connectivity of the first internal electrode 21 or the second internal electrode 22 may be 95% or more.

The connectivity of the internal electrode may be defined as a length of actual portions in which the internal electrodes are formed based on the entire length of the first internal electrode 21 or the second internal electrode 22.

The connectivity of internal electrode maybe measured by scanning a cross-section of the ceramic body 10 in a length direction as an image by using the Scanning Electron Microscope (SEM), as shown in FIG. 2.

More specifically, the connectivity thereof may be calculated by measuring total length of an actual portion at which the internal electrode is formed based on the entire length of the cross-section of the internal electrode with respect to any one of the dielectric layers extracted from the image obtained by scanning a cross section in the length and thickness directions L-T taken at the central portion of the ceramic body 10 in the width (W) direction using the SEM as shown in FIG. 2.

The connectivity of the internal electrode layers may be measured in the capacitance formation part S which indicates the area in which the first and second internal electrodes 21 and 22 are overlapped with each other.

In addition, in the case in which the connectivity measurement of the internal electrode is applied to 10 and more internal electrode layers of the central region of the cross-section in the length-thickness directions (L-T) and the average value thereof is measured, the connectivity of the internal electrode layers may be generalized.

In addition, the connectivity of the internal electrode layers, indicating an applying rate of the internal electrode, maybe defined as a ratio of an actual area in which the internal electrodes are formed, with respect to the entire area of the internal electrodes, at a random point.

In order to implement the internal electrodes 21 and 22 having the connectivity of 95% or more, an particle size of a metal powder in the conductive paste for forming the internal electrode may be changed, or amounts of an organic material or ceramic to be added may be controlled.

In addition, the electrode connectivity may be controlled by controlling a raising-temperature rate and a firing atmosphere in a firing process.

According to the embodiment of the present invention, the connectivity of the internal electrode layers may be implemented by controlling the average particle size of the dielectric grains of the central region, the upper region, and the lower region of the capacitance formation part, and the number of dielectric grains per layer so as to be different.

According to the embodiment of the present invention, the first and second internal electrodes 21 and 22 are implemented to have the connectivity of 95% or more, whereby the high capacitance multilayered ceramic capacitor having increased capacitance and excellent reliability may be manufactured.

A multilayered ceramic electronic component according to another embodiment of the present invention may include: a ceramic body including dielectric layers; and first and second internal electrodes disposed in the ceramic body so as to face each other, having the dielectric layer interposed therebetween, wherein the ceramic body includes a capacitance formation part in which capacitance is formed and a non-capacitance formation part provided on at least one surface of upper and lower surfaces of the capacitance formation part, and in the case that the capacitance formation part is divided into three regions in a thickness direction of the ceramic body, in a central region among the three regions; dielectric grains have an average particle size of 150 nm or less, and the number of dielectric grains per layer is 4 or more, and in upper and lower regions, dielectric grains have an average particle size of 200 nm or less, respectively, the number of dielectric grains per layer is 3 or more, and each thickness of the upper and lower regions satisfies 1 to 20% based on the entire thickness of the capacitance formation part in a thickness direction of the ceramic body.

When the length and the width of the ceramic body are 0.6±0.1 mm and 0.3±0.1 mm, respectively, the thickness of the ceramic body may be 0.22 mm or less.

When the length and the width of the ceramic body are 1.0±0.1 mm and 0.5±0.1 mm, respectively, the thickness of the ceramic body may be 0.35 mm or less.

When the length and the width of the ceramic body are 1.6±0.1 mm and 0.8±0.1 mm, respectively, the thickness of the ceramic body may be 0.55 mm or less.

The first and second internal electrodes may have an average thickness of 0.6 μm or less, respectively.

The dielectric layer may have an average thickness of 0.6 μm or less.

The first or second internal electrode may have connectivity of 95% or more.

In the multilayered ceramic electronic component according to another embodiment of the present invention, an overlapped description with the description of the multilayered ceramic electronic component according to the embodiment of the present invention described above will be omitted.

Hereafter, although the present invention will be described in detail with reference to Inventive Example and Comparative Example, it is not limited thereto.

According to Inventive Example, with respect to the multilayered ceramic capacitor including the dielectric layer 1 having the average thickness of 0.6 μm or less, the capacitance formation part is divided into three regions in a thickness direction of the ceramic body, and whether or not the reliability is improved according to an average particle size of dielectric grains for each region and the number of dielectric grains per layer was tested.

The multilayered ceramic capacitor according to the present embodiment was manufactured as follows.

First, a slurry containing powder such as barium titanate ($BaTiO_3$) powder having an average particle size of 0.1 μm, or the like, was applied to a carrier film and dried thereon to prepare a plurality of ceramic green sheets having a thickness of 1.05 μm and 0.95 μm, thereby forming a dielectric layer 1.

Then, a conductive paste for an internal electrode including a nickel powder having an average particle size of 0.1 to 0.2 μm, and 40 to 50 parts by weight was prepared.

The conductive paste for internal electrode was applied to the green sheet by a screen printing method to form the internal electrode, and then, 400 to 500 layers of the internal electrodes were multilayered to form a multilayered body.

Next, a compressing process and a cutting process were performed to form a chip having a thickness of 0.22 mm corresponding to a 0603 (length×width) standard, a chip having a thickness of 0.35 mm corresponding to a 1005 (length×width) standard, and a chip having a thickness of 0.55=corresponding to a 1608 (length×width) standard, and thus formed chips were fired at a temperature of 1050~1200° C. under reduction atmosphere of 0.1% or less of $H_2$.

Then, processes such as an external electrode formation process, a plating process, and the like, were performed to manufacture the multilayered ceramic capacitor.

In the case that the capacitance formation part is divided into three regions in a thickness direction of the ceramic body, in samples of the multilayered ceramic capacitor, the average particle size of dielectric grains of the central region was 150 nm, and the dielectric grains of the upper and lower regions had an average particle size of 200 nm, respectively.

In addition, in the state in which the number of dielectric grains per layer of the dielectric layers of the upper and lower regions is 3, the multilayered ceramic capacitor was manufactured by changing the number of dielectric grains per layer of the dielectric layer of the central region.

As a result obtained by observing the cross-section of the manufactured multilayered ceramic capacitor, the average thickness of the internal electrode was approximately 0.6 μm, and the average thickness of the dielectric layer was 0.6 μm.

According to comparative example, a multilayered ceramic capacitor was manufactured by the same method as Inventive Example except that the number of dielectric grains per layer of the dielectric layer of the central region of the capacitance formation part is different from the numerical range of the present invention.

In addition, the connectivity of the internal electrode was measured in the capacitance formation part with respect to the cross-section in the length and thickness directions L-T taken at the central portion of the ceramic body 10 in the width (W) direction. In order to measure the connectivity of the internal electrode, ten internal electrodes were randomly chosen and the total length of actual portions at which the internal electrodes are formed based on the entire length of the cross-sections of the internal electrodes from images scanned by using the SEM was measured.

Table 1 below shows comparison between Inventive Example and Comparative Examples in view of the connectivity of the internal electrode, the short-circuit defect rate, high temperature accelerated lifespan failure rate, and the acoustic noise according to the number of dielectric grains per layer of the central portion, the upper and lower portions of the capacitance formation part.

Referring to Table 1 above, it may be appreciated that comparative examples 1 and 2 showed that the number of dielectric grains per layer of the central portion of the capacitance formation part is beyond the numerical range of the present invention, the connectivity of the internal electrode is less than 95%, and the short defect rate, high temperature accelerated lifespan failure rate and acoustic noise are also high.

Meanwhile, it may be appreciated that inventive example 1, which satisfies the numerical range of the present invention, showed that the connectivity of the internal electrode is 98%, and all of the short defect rate, high temperature accelerated lifespan failure rate, and acoustic noise are also relatively low, which has excellent effects.

As set forth above, according to the embodiment of the present invention, the high capacitance is implemented and the connectivity of the internal electrode layers is improved, whereby the high capacitance multilayered ceramic electronic component having excellent accelerated lifespan extension, withstand voltage characteristics and reliability may be implemented.

In addition, with the multilayered ceramic electronic components according to the embodiments of the present invention, the acoustic noise may be reduced by controlling grain particle sizes and the number of particles per layer of the dielectric layers of the central portion, the upper portion, and the lower portion of the capacitance forming part.

While the present invention has been shown and described in connection with the embodiments, it will be apparent to those skilled in the art that modifications and variations can be made without departing from the spirit and scope of the invention as defined by the appended claims.

What is claimed is:

1. A multilayered ceramic electronic component comprising:
    a ceramic body including dielectric layers having an average thickness of 0.6 μm or less; and
    first and second internal electrodes disposed in the ceramic body so as to face each other, having the dielectric layer interposed therebetween,
    wherein the ceramic body includes a capacitance formation part in which capacitance is formed and a non-capacitance formation part provided on at least one surface of upper and lower surfaces of the capacitance formation part, and when the capacitance formation part is divided into three regions in a thickness direction of the ceramic body, in a central region among the three regions, dielectric grains have an average particle size of 150 nm or less, the number of dielectric grains per layer is 4 or more, and in upper and lower regions, dielectric

TABLE 1

| | Number of Dielectric Grains Per Layer of Central Portion | Number of Dielectric Grains Per Layer of Upper and Lower Portions | Electrode Connectivity | Short-circuit Defect Rate (%) | High Temperature Accelerated Lifespan Failure Rate (Fit) | Acoustic Noise |
|---|---|---|---|---|---|---|
| Inventive Example 1 | 4 | 3 | 98 | 2 | 10 | 23 dB |
| Comparative Example 1 | 3 | 3 | 94 | 10 | 24 | 25 dB |
| Comparative Example 2 | 2 | 3 | 90 | 15 | 33 | 28 dB | grains have an average particle size of 200 nm or less, respectively, and the number of dielectric grains per layer is 3 or more, and the average particle size of the dielectric grains in the central region is different from that of the dielectric grains in the upper and lower regions.

2. The multilayered ceramic electronic component of claim 1, wherein when a length and a width of the ceramic body are 0.6±0.1 mm and 0.3±0.1 mm, respectively, a thickness of the ceramic body satisfies 0.22 mm or less.

3. The multilayered ceramic electronic component of claim 1, wherein when a length and a width of the ceramic body are 1.0±0.1 mm and 0.5±0.1 mm, respectively, a thickness of the ceramic body satisfies 0.35 mm or less.

4. The multilayered ceramic electronic component of claim 1, wherein when a length and a width of the ceramic body are 1.6±0.1 mm and 0.8±0.1 mm, respectively, a thickness of the ceramic body satisfies 0.55 mm or less.

5. The multilayered ceramic electronic component of claim 1, wherein the first and second internal electrodes have an average thickness of 0.6 µm or less, respectively.

6. The multilayered ceramic electronic component of claim 1, wherein the first internal electrode or the second internal electrode has connectivity of 95% or more.

7. A multilayered ceramic electronic component comprising:
a ceramic body including dielectric layers; and
first and second internal electrodes disposed in the ceramic body so as to face each other, having the dielectric layer interposed therebetween,
wherein the ceramic body includes a capacitance formation part in which capacitance is formed and a non-capacitance formation part provided on at least one surface of upper and lower surfaces of the capacitance formation part, and when the capacitance formation part is divided into three regions in a thickness direction of the ceramic body, in a central region among the three regions, dielectric grains have an average particle size of 150 nm or less, the number of dielectric grains per layer is 4 or more, and in upper and lower regions, dielectric grains have an average particle size of 200 nm or less, respectively, the number of dielectric grains per layer is 3 or more, and each thickness of the upper and lower regions satisfies 1 to 20% based on the entire thickness of the capacitance formation part in a thickness direction of the ceramic body, and the average particle size of the dielectric grains in the central region is different from that of the dielectric grains in the upper and lower regions.

8. The multilayered ceramic electronic component of claim 7, wherein when a length and a width of the ceramic body are 0.6±0.1 mm and 0.3±0.1 mm, respectively, a thickness of the ceramic body satisfies 0.22 mm or less.

9. The multilayered ceramic electronic component of claim 7, wherein when a length and a width of the ceramic body are 1.0±0.1 mm and 0.5±0.1 mm, respectively, a thickness of the ceramic body satisfies 0.35 mm or less.

10. The multilayered ceramic electronic component of claim 7, wherein when a length and a width of the ceramic body are 1.6±0.1 mm and 0.8±0.1 mm, respectively, a thickness of the ceramic body satisfies 0.55 mm or less.

11. The multilayered ceramic electronic component of claim 7, wherein the first and second internal electrodes have an average thickness of 0.6 µm or less, respectively.

12. The multilayered ceramic electronic component of claim 7, wherein the dielectric layer has an average thickness of 0.6 µm or less.

13. The multilayered ceramic electronic component of claim 7, wherein the first internal electrode or the second internal electrode has connectivity of 95% or more.

* * * * *